TAPE CARTRIDGE FOR USE WITH TAPE RECORDERS

Filed Dec. 2, 1966

INVENTOR
FRED HUGEL

BY Philip D. Amins

ATTORNEY

April 15, 1969 F. HUGEL 3,438,590

TAPE CARTRIDGE FOR USE WITH TAPE RECORDERS

Filed Dec. 2, 1966 Sheet 2 of 2

INVENTOR
FRED HUGEL

BY Philip D. Amins

ATTORNEY

United States Patent Office 3,438,590
Patented Apr. 15, 1969

3,438,590
TAPE CARTRIDGE FOR USE WITH TAPE RECORDERS

Fred Hugel, West Acton, Mass., assignor to Sanders Associates, Inc., Nashua, N.H., a corporation of Delaware Filed Dec. 2, 1966, Ser. No. 598,675
Int. Cl. G11b *15/32*
U.S. Cl. 242—55.13 12 Claims

ABSTRACT OF THE DISCLOSURE

The present invention pertains to a tape cartridge for use with magnetic tape recorders and, more particularly, to a tape cartridge which will always maintain tension in that portion of the tape disposed between the two reels in the cartridge. This is accomplished by having one of the reels locked in position to prevent any rotational movement thereof when the cartridge is removed from the recorded deck while the other reel has a one-way clutch associated therewith which permits movement of the tape in only one direction, thus serving to create and maintain tension in the tape disposed between the two reels. The tape cartridge also incorporates locking means for quickly and easily securing and detaching the cartridge to and from the recorder.

The tape cartridge of the present invention is primarily intended for use in applications where a tape recorder must be quickly and easily loaded and unloaded, and wherein the tape cartridge is subject to high shock and vibration loads and environments which vary greatly. One application of this type is where the tape recorder is utilized in aircraft. Prior art tape cartridges are unable to withstand high shock and vibration loads while maintaining tension in the tape disposed between the two reels without appreciable slippage and thus slackening of the tape. The slackening of the tape renders the positioning of the tape in the recorder difficult, and may also result in a recording whose quality is less than that desired. Another problem encountered with present-day tape cartridges is that securing them to and detaching them from a tape recorder is relatively time-consuming, since alignment of the cartridge with the tape recorder is relatively difficult.

It is therefore the principal object of the present invention to provide a tape cartridge, for use with magnetic tape recorders, which is extremely rugged and durable, which can withstand rough handling and shock and vibration loads, and which can be utilized in widely varying environments.

It is another object of the present invention to provide a tape cartridge, for use with tape recorders, which, when subjected to high shock and vibration loads, will maintain tension in the portion of the tape disposed between its two reels.

It is a further object of the present invention to provide a tape cartridge which can be stored for extended periods of time, maintaining tension in the portion of the tape disposed between the two reels of the cartridge during storage, so that cartridge can be secured to a tape recorder without any inspection.

It is still another object of the present invention to provide a tape cartridge of the above-described character which can be quickly and easily secured to and removed from a tape recorder.

It is yet a further object of the present invention to provide a tape cartridge, for use with tape recorders, which utilizes a one-way roller clutch in conjunction with one of its reels to permit movement of the tape in only one direction, to thus create and maintain tension in that portion of the tape disposed between the two reels of the cartridge.

It is still a further object of the present invention to provide a tape cartridge, for use with tape recorders, which utilizes a locking means in conjunction with one of its reels to prevent rotational movement thereof, and which has a one-way roller clutch associated with the other of its reels which permits the movement of the tape in only one direction, thereby creating and maintaining tension in that portion of the tape disposed between the two reels of the cartridge.

These and other objects, features and advantages of the present invention will become more apparent when considered in conjunction with the following detailed description and the accompanying drawings, wherein.

In the preferred embodiment of the invention, the tape recorder cartridge includes a supply reel assembly and a take-up reel assembly. The supply reel has a locking means associated therewith to prevent any rotational movement of the supply reel when the cartridge is detached from the recorder. The take-up reel has a one-way roller clutch associated therewith which permits movement of the tape in only one direction. The locking means, in conjunction with the one-way roller clutch, creates and maintains tension in the tape disposed between the supply and take-up reels. When it is placed upon a tape recorder, the tape cartridge is locked (or secured) to the recorder and actuated (or prepared for recording) by means of a locking and actuation key secured to the cartridge. The locking and actuation key, when rotated a quarter-turn, i.e., 90°, simultaneously secures the cartridge to the tape recorder and releases the locking means associated with the supply reel, thus permitting movement of the tape from the supply reel to the take-up reel for recording of information on the tape.

Figures 1, 5:
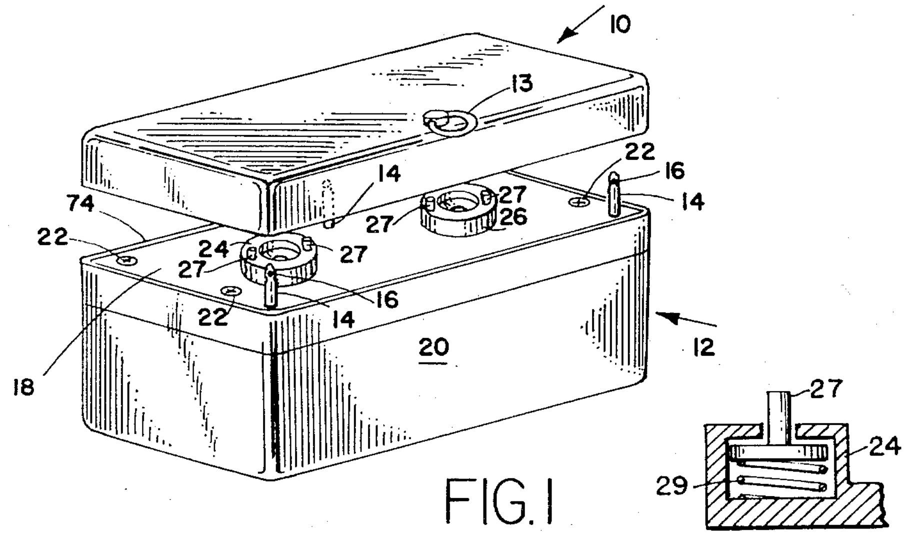
FIG. 1 is a perspective view of the tape cartridge of the present invention and a tape recorder with which it is to be utilized.
FIG. 5 is a fragmentary cross sectional view of one of the drive plungers and its spring.

Referring now to FIG. 1 of the drawings, there is shown a tape cartridge 10, constructed in accordance with the present invention, and a tape recorder 12 to which the cartridge is secured. Tape cartridge 10 has a locking and actuation key 13. Tape recorder 12 has three guideposts 14, which have lateral holes 16 therein. The posts 14 extend upward from the top surface of tape deck 18, which is secured to the recorder case 20 by means of screws 22. Also projecting upward from tape deck 18 are a supply reel drive 24 and a take-up reel drive 26. As best shown in FIGURE 5, plungers are biased in an upward direction by means of springs 29 and project upward from the top surfaces of the reel drives. It is to be noted herein that the standard drive mechanisms associated with the recorder to effect rotation of the reel drive 26, and the capstan and pinch rollers, commonly utilized in tape recorders, have been omitted for the purpose of clarity. However, these are well-known in the art and do not form a part of the present invention.

Figure 2:
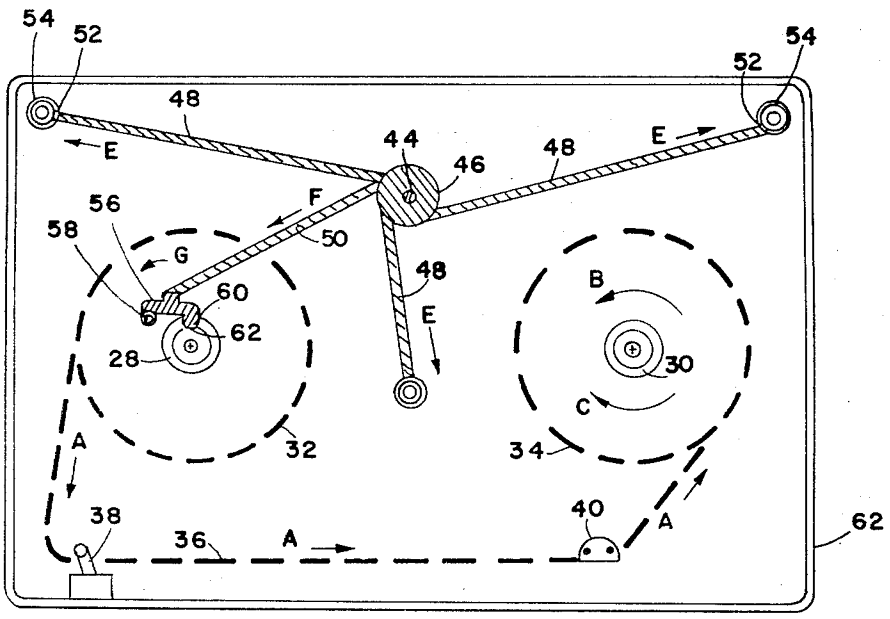
FIG. 2 is a bottom view of the tape cartridge with its cover plate removed.
Figure 4:
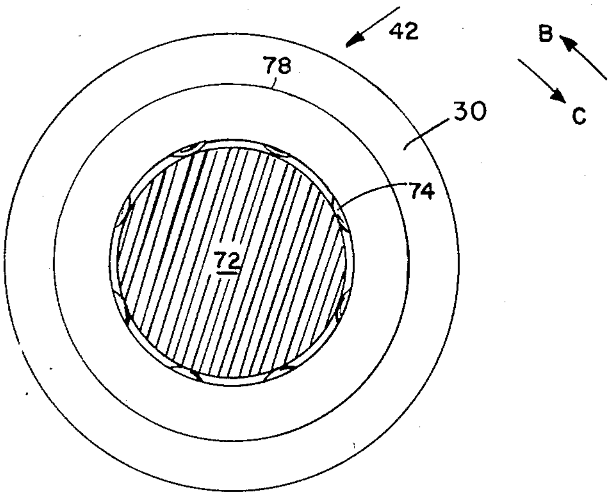
FIG. 4 is a partial sectional view depicting the one-way roller clutch as utilized in the present invention.

A bottom view of the tape cartridge with its protective cover removed is depicted in FIG. 2. The cartridge includes a supply reel hub 28 and a take-up reel hub 30, having supply and take-up reels 32 and 34 (shown dotted) thereon, respectively. Tape 36 moves from supply reel 32, in the direction indicated by arrow A, and passes around guide 38 and roller 40 to take-up reel 34. Take-up reel hub 30 has connected therewith a one-way roller clutch 42 (as shown in FIG. 4), which permits rotation of the reel hub 30, and thus of reel 34, only in the direction indicated by arrow B. The supply reel hub 28 has a locking means (to be described in more detail hereinafter) connected thereto, which prevents any rotational movement of the hub 28 when the tape cartridge is detached from the tape recorder or in an otherwise unactuated condition.

Thus, when tape reels 32 and 34 having tape 36 disposed therebetween are placed on hubs 28 and 30, respectively, and reel 34 is rotated slightly in the direction indicated by arrow B, there is created a tension in that portion of the tape disposed between the two reels. The one-way roller clutch 42 prevents any rotational movement of hub 30, and thus of reel 34, in the direction indicated by arrow C. Therefore, if the cartridge is subjected to any shock or vibration loads which cause, or tend to cause, rotational movement of reels 32 and 34, the tension in the tape will be either maintained or increased to make the tape even more taut than before. However, the tape can never slip so as to become slackened.

The locking and actuation key 13 includes a shaft 44 and a lock rod ring 46 which is positioned on the underside of the tape cartridge and secured to said shaft. Ring 46 may be formed integrally with shaft 44 or may be secured thereto in any suitable manner. Secured to ring 46 are a plurality of lock rods 48 and a latch rod 50. Lock rods 48 are disposed within openings 52 in the side walls of alignment bushings 54, and are adapted to move inward and outward within the bushings in a manner to be described in more detail hereinafter. Latch rod 50 has a latch 56 at its outer end which is pivotally movable about a rivet or pin 58. The latch includes a projection or key portion 60 which is adapted to fit into a keyway 62 in supply reel hub 28. The positioning of key 60 in keyway 62 serves as a positive brake to prevent any rotational movement of hub 28 when the tape cartridge is in its detached or unactuated position. As explained previously, this feature, in combination with the action of one-way roller clutch 42 on reel hub 30, causes tension in the portion of the tape disposed between the supply and take-up reels.

Figure 3:
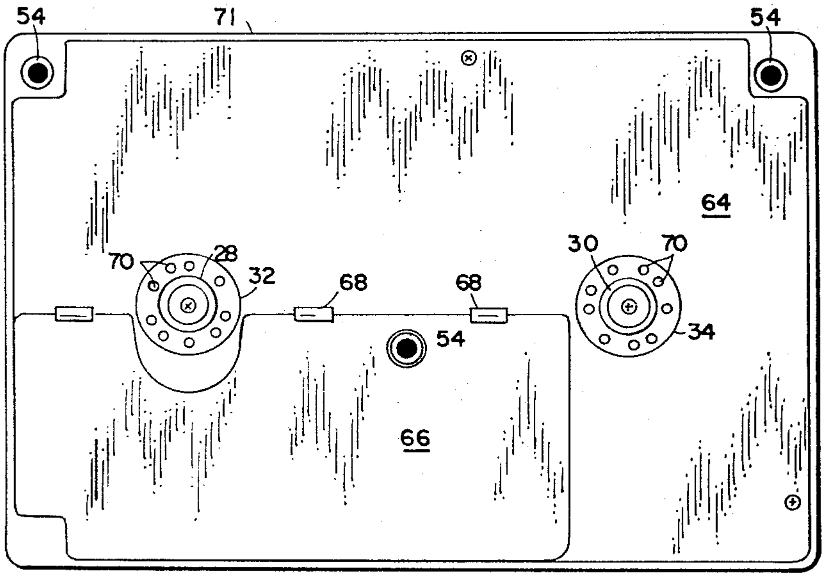
FIG. 3 is a bottom view of the tape cartridge with its cover plate secured thereto.

In FIG. 3 there is depicted a bottom view of tape cartridge 10 with cover plate 64 secured thereto. The cover plate includes a protective door portion 66 which is connected to the cover plate by means of spring hinges 68. Tape reels 32 and 34 have a plurality of recesses 70 which are adapted to engage one of the plungers 27 on reel drives 24 and 26, as will be explained more fully hereinafter.

When it is desired to secure tape cartridge 10 to tape recorder 18, protective door portion 66 is lifted up and pivoted rearward about spring hinges 68 (as viewed in FIG. 3) and snapped into abutting engagement with cover plate 64, to thereby expose a portion of the tape disposed between the two reels. The cartridge is then placed upon the recorder with guideposts 14 projecting into bushings 54 and the exposed portion of the tape being placed between the capstan and pinch rollers, the capstan and pinch rollers not being shown. The edges 71 of the tape cartridge fit within a groove 74 in the edge of tape deck 18. Groove 74 is filled with a gasket material to form a tight seal between the carmtridge and the recorder. The cartridge is locked with respect to the recorder by rotating key 13 a quarter-turn clockwise (as viewed in FIG. 1). Rotation of the key causes locking rods 48 to engage guideposts 14 by means of inward movement of the rods into bushings 54 and through holes 16 in the guideposts. Concomitant with the above, latch rod 48 is caused to move in the direction indicated by arrow F. This movement pivots latch 56 about rivet 58 and causes key 60 to move outward from keyway 62, thus freeing hub 28 for rotational movement. When the cartridge is secured to the recorder in the manner above described, tape reels 32 and 34 rest upon hubs 28 and 30, respectively.

The geometrical positioning of recesses 70 on the tape reels 32 and 34 is such that the recesses will engage only one of plungers 27 at any one time. If engagement occurs when the cartridge is secured to the recorder as described above, the rotational movement of the reel drives will correspondingly cause rotational movement of the tape reels. If engagement does not occur, the actuation of the recorder will result in rotational movement of the reel drives only. However, after a rotational movement of the reel drives of a maximum of 10°, one of the plungers 27 will be engaged by one of the recesses 70. Thus, the recorder is effectively capable of recording information as soon as it is actuated.

The tape cartridge 10 is removed from the recorder 18 by reversing the procedure described hereinabove in conjunction with the securing of the cartridge to the recorder. More particularly, the key 13 is rotated a quarter-turn counterclockwise (as viewed in FIG. 1), whereupon the lock rods 48 move outward from lateral holes 16 in guideposts 14 and outward from the bushings 54. Concomitantly therewith, latch rod 50 moves in a direction opposite to that indicated by arrow F (see FIG. 2), thus causing latch 56 to rotate in a clockwise direction. It is herein to be noted that in most instances key 60 will not be aligned with keyway 62 when the cartridge is being detached from the recorder; therefore, the pin 58 has a spring means (not shown) connected therewith which permits a slight rotational movement of the pin about its own longitudinal axis. Thus, when key 60 abuts the periphery of hub 28, neither latch rod 50 nor latch 56 has a force applied thereto which might cause same to become broken or otherwise damaged.

Referring now to FIG. 4, there is shown the previously mentioned one way clutch 52. This clutch is of the kind which prevents relative rotation in one predetermined direction between two members such as a shaft and a sleeve while allowing these members to rotate freely with respect to each other in the other direction. Clutches of this general kind are well known and are readily available commercially. One clutch suitable for use in the present invention is available from The Torrington Company, Torrington, Conn.

The take-up reel hub 30 is fastened rigidly to the outer race or sleeve 78 while the entire clutch is slipped over an upstanding stationary reel shaft 72 with the balls or rollers, preferably rollers, in rolling contact therewith. The clutch 42 is constructed so that if the hub 30 and the sleeve 78 attempt to rotate in one direction, for example, clockwise, in the direction of the arrow C, no rotation can occur. However, the hub 30 can rotate freely in the opposite direction indicated by the arrow B. This kind of one way operation is usually obtained by a selective wedging of balls or rollers, but the details of the operation of the clutch 42 are not a part of the present invention and, therefore, have not been described.

It is thus seen that the present invention provides a detachable tape cartridge, for use with a tape recorder, which is capable of withstanding high shock and vibration loads without any slackening of the tape disposed between the two reels of the cartridge, which is easily and quickly secured to the tape recorder and actuated for use therein, and which is also easily and quickly removed from the tape recorder.

While I have shown and described the preferred embodiments of my invention, there are many changes, improvements and modifications which may be made therein without departing from the spirit and scope thereof, as defined in the appended claims.

What is claimed is:

1. A tape recorder cartridge adapted to be secured to a tape recorder, said cartridge comprising a housing, a pair of tape reels adapted to have tape connected therebetween disposed within said housing, one of said reels having locking means connected thereto to prevent rotational movement thereof, the second of said reels having means connected thereto to permit rotational movement of said reel in one direction while preventing rotational movement of said reel in an opposite direction, whereby that portion of the tape disposed between said reels has tension therein and movement of said second reel in said one direction maintains and creates further tension in that portion of said tape disposed between said reels.

2. A tape recorder cartridge in accordance with claim 1, wherein said one of said reels is a supply reel, and said second reel is a take-up reel, and wherein said means connected to said second reel comprises a one-way roller clutch.

3. A tape recorder cartridge in accordance with claim 2, wherein said cartridge includes a supply hub upon which said supply reel is mounted for rotational movement therewith, said locking means includes a latch for engaging said supply hub to prevent rotational movement thereof.

4. A tape recorder cartridge in accordance with claim 3, wherein said cartridge includes a key connected to said housing and rotationally movable therein, rotational movement of said key serving to detachably secure said cartridge to said tape recorder and, concomitantly therewith, to actuate said cartridge for recording by causing said latch to become disengaged from said supply hub.

5. In combination, a tape recorder and a detachable tape cartridge, said tape recorder being adapted to engage said cartridge in mating relationship, said tape cartridge including a take-up reel and a supply reel mounted on a take-up hub and a supply hub respectively, said tape cartridge further including means for creating and maintaining tension in that portion of the tape disposed between said reels, said last named means comprising latch means connected to said supply hub to prevent rotational movement thereof when said cartridge is not locked to said recorder, and means operatively connected with said take-up hub to permit rotational movement of said hub in one direction while preventing rotational movement thereof in an opposite direction, and means for concomitantly locking said cartridge to said recorder and for actuating said cartridge for recording information.

6. The combination of claim 5, wherein said means connected to said take-up hub is a one-way roller clutch.

7. The combination of claim 6, wherein said tape recorder includes a plurality of upwardly projecting guideposts and said cartridge includes a plurality of bushings, said cartridge being placed in mating relationship with said recorder by positioning said guideposts within said bushings.

8. The combination of claim 7, wherein said means for locking said cartridge to said recorder and for actuating said cartridge comprises, key means, lock rod means, and said latch means, said lock rod means being interconnected between said key means and said bushings, said latch means being interconnected between said key means and said supply hub, whereby rotational movement of said key means causes lateral movement of said lock rod means which in turn causes said lock rod means to engage said guideposts and positionally secure said tape cartridge to said tape recorder.

9. The combination of claim 8, wherein said latch means comprises, a latch rod, and a latch, said latch rod having one end thereof connected to said key means and the other end thereof connected to said latch, said latch being pivotally connected to said housing and having a member adapted to engage said supply hub, whereby rotational movement of said key means positionally secures said cartridge to said recorder and concomitantly therewith causes said latch to pivotally move to cause said latch member to disengage the supply hub.

10. The combination of claim 9, wherein said tape recorder includes a supply reel drive and a take-up reel drive, each of said reel drives having at least one spring-biased upwardly projecting member, said supply and take-up reels including an end wall having a plurality of spaced holes formed therein, said end walls being placed in abutting engagement with said reel drives, one of said holes in said supply reel engaging said projecting member in said supply reel drive and one of said holes in said take-up reel engaging said projecting member in said take-up reel drive after a predetermined maximum angular rotation of said reel drives, to thereby cause said supply and take-up reels to rotate with said supply and take-up reel drives.

11. The combination of claim 9, wherein said lock rod means comprises a plurality of lock rods, each of said lock rods having one end thereof connected to said key means and the other end thereof connected to one of said bushings for lateral movement therewithin.

12. The combination of claim 9, wherein said key means comprises, a handle, a shaft, and a ring, said handle being positioned on the outside of said housing and said ring being positioned within said housing, said shaft being interconnected between said handle and said ring, said key assembly being rotatable about the longitudinal axis of said shaft, and said one end of said lock rods and said one end of said latch rod being connected to said ring.

References Cited

UNITED STATES PATENTS 2,933,319 4/1960 Proctor.

FOREIGN PATENTS 712,536 7/1954 Great Britain.

LEONARD D. CHRISTIAN, *Primary Examiner.*